United States Patent [19]
Reed

[11] Patent Number: 4,969,132
[45] Date of Patent: Nov. 6, 1990

[54] DELAY QUANTIZATION TECHNIQUE TO REDUCE STEERING ERRORS IN DIGITAL BEAMFORMERS

[75] Inventor: Francis A. Reed, Yorba Linda, Calif.
[73] Assignee: Hughes Aircarft Company, Los Angeles, Calif.
[21] Appl. No.: 307,202
[22] Filed: Feb. 3, 1989

Related U.S. Application Data
[63] Continuation of Ser. No. 52,083, May 21, 1987, abandoned.

[51] Int. Cl.$^5$ .............................................. G01S 11/00
[52] U.S. Cl. ..................................... 367/122; 367/123
[58] Field of Search .................................. 367/122, 123

[56] References Cited
U.S. PATENT DOCUMENTS

| | | | |
|---|---|---|---|
| 4,003,016 | 1/1977 | Remley | 367/123 |
| 4,170,766 | 10/1979 | Pridham et al. | 367/123 |
| 4,233,678 | 11/1980 | Brady, III | 367/123 |
| 4,643,028 | 2/1987 | Kondo et al. | 367/105 |
| 4,688,045 | 8/1987 | Knudsen | 367/123 |

Primary Examiner—Thomas H. Tarcza
Assistant Examiner—Daniel T. Pihulic
Attorney, Agent, or Firm—Wanda K. Denson-Low

[57] ABSTRACT

Quantized delay values used in a digital beamformer are selected so as to minimize the derivative of the beamformer pattern. A first set of quantization error values, one for each hydrophone, is determined from the precise delay values and a second set determined by adding a shading factor times the sample period to each member of the first set. Each set of combinations of members of the first and second sets of error values is then examined to determine which set minimizes the derivative of the beamformer pattern. The quantized delay values are then determined by selecting the quantized delay value corresponding to the error value in the set which minimizes the derivative.

13 Claims, 5 Drawing Sheets

DELAY QUANTIZATION TECHNIQUE TO REDUCE STEERING ERRORS IN DIGITAL BEAMFORMERS

This application is a continuation of application Ser. No. 07/052,083, filed May 21, 1987 now abandoned.

TECHNICAL FIELD

The subject invention relates to the technical field of distant object detection by such means as sonar

BACKGROUND OF THE DISCLOSURE

1. Field of the Invention

The subject invention relates to sonar systems and, more particularly, to a technique for quantization of delays in digital beamformers used in such systems.

2. Description of Related Art

In the prior art, beamformers comprising an arbitrary array of hydrophones are known. Such arrays permit directional sensitivity. In order to sense a signal wavefront at a selected arrival angle to the hydrophone line, the output signal of each hydrophone is appropriately delayed so that the collective outputs add coherently, in phase. The resultant output is characterized by a main lobe about a maximum response axis in the desired look direction and several side lobes in other directions.

In a digital beamformer, the outputs of the respective hydrophones are sampled by analog to digital converters and fed to a digital processor for storage and summing. A shading coefficient may also be applied to each selected hydrophone output prior to summing, in order to reduce the sidelobes of the system.

In digital beamforming systems, the exact values of delay used to steer a beam in a given direction must be quantized to multiples of the system sample interval. Quantization in effect determines which hydrophone output sample will be associated with a given steering angle.

Most existing digital beamformers quantize the time delays by simply rounding the full precision values. While this approach assures that the delays are as close as possible to the true values within the available accuracy of the beamformer, it does not relate the quantization to the resulting steering angle In fact, for certain array geometries, rounding can be shown to be a poor choice from the point of view of preserving steering accuracy. The same is true of delay quantization by truncating the exact values, as is done in some systems.

Existing quantization techniques, such as truncation or rounding thus contribute to deviations from the desired steering angle In systems where high accuracy is required, e.g., the target is at a relatively long distance, it is desirable to eliminate as many errors as possible to gain steering accuracy. In other systems, a more accurate quantization technique could produce acceptably accurate steering from a courser quantization, thereby reducing the sample rate and hardware requirements, and hence the expense of the system.

SUMMARY OF THE INVENTION

It is therefore an object of the invention to improve sonar systems.

It is another object of the invention to improve beamforming systems.

It is another object of the invention to minimize steering error in digital beamforming systems.

It is another object of the invention to provide a method for determining delay quantization in a digital beamformer which more accurately steers the sonar beam.

It is another object of the invention to relate quantization of delays in a digital beam forming system to the steering angle.

It is yet another object of the invention to reduce the required sample rate and attendant hardware requirements and cost of a digital beamforming system.

The invention provides a technique for the quantization of delays in a digital beamforming system. The individual delays are quantized so as to minimize the first derivative of the spatial response pattern at the desired steering angle. Since the location of the zero of this derivative in the main lobe region defines the location of the true steering angle, derivative minimization has the effect of minimizing steering errors due to quantization. The selection of quantized delays is based on the minimization of a simple weighted sum of quantization errors, resulting in very efficient operation.

The invention has potential application in any sonar using a digital time delay beamformer. In most systems, the data sample rate is substantially higher than the Nyquist rate to provide sufficiently accurate beam steering. The use of the quantization method of the invention allows use of a lower sample rate than conventional methods to meet a given steering accuracy specification. This in turn reduces system cost through memory and computation rate reductions. In sonars with a fixed sample rate, the method of the invention produces more accurate beam placement than that achieved with conventional delay quantization.

BRIEF DESCRIPTION OF THE DRAWINGS

The just summarized invention will now described in detail in conjunction with the drawings, of which.

DESCRIPTION OF THE PREFERRED EMBODIMENTS

Figure 1:
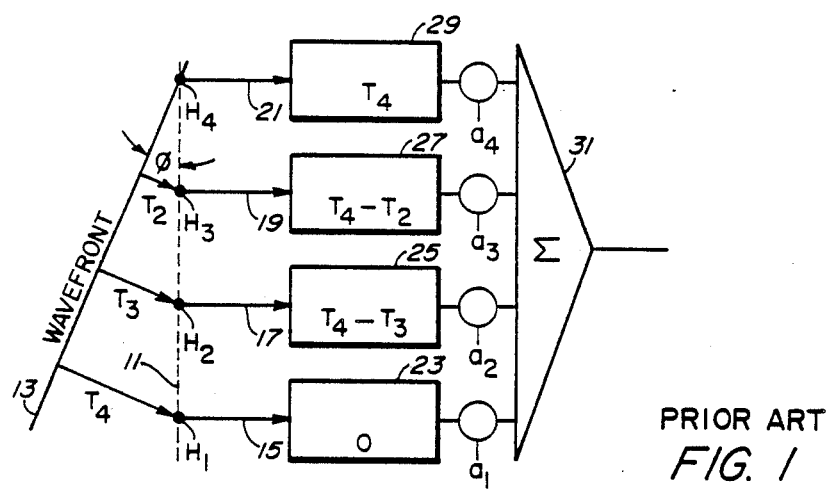
FIG. 1 is a schematic diagram illustrating a prior art analog beamformer.

FIG. 1 illustrates a prior art analog beamformer wherein a group of hydrophones $H_1$ $H_2$ ... $H_4$ are arrayed on a line 11. In order to sense a signal wavefront 13 at an arrival angle to the hydrophone line 11, the hydrophone output signals are delayed by appropriate amounts so that they add coherently, in phase. In FIG. 1, the hydrophone output signals 15, 17, 19, 21 are delayed by respective analog delay elements 23, 25, 27, 29. The outputs of these analog delay elements 23, 25, 27, 29 are multiplied by respective shading coefficients $a_1$ ... $a_4$ and then added by a summer 31.

Figure 2:
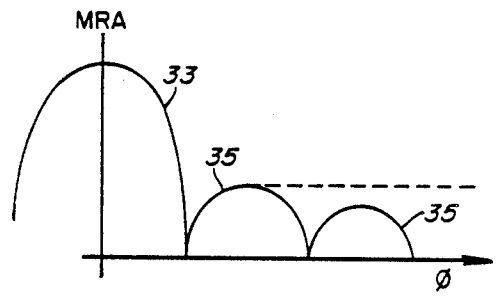
FIG. 2 is a graph of the power at the output of the summer of FIG. 1 as a function of signal.

An illustration of the typical resultant output power of the beamformer summer 31 as a function of the incident or steering angle $\phi$ is shown in FIG. 2. The summer output is characterized by a main lobe 33, and several sidelobes 35. The main lobe 33 is formed about a maximum response axis (MRA).

Figure 3:
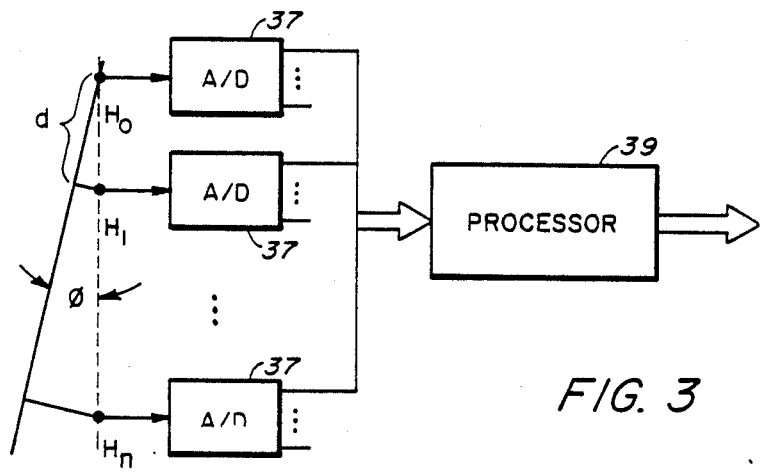
FIG. 3 is a schematic of a digital beamformer for practicing the preferred embodiment.

FIG. 3 illustrates a digital beamformer employing a digital processor 39. In this beamformer, the outputs of the respective hydrophones $H_0, H_1, \ldots H_n$ are sampled by respective analog to digital converters 37. The successive samples are fed to a digital processor 39 for storage, shading, and summing.

The beamformer processor 39 examines a wide variety of incident angles $\phi$. For each angle $\phi$, the processor 39 selects the hydrophone output $H_n$ sampled at the time dictated by the quantized delay value for that angle for summing.

Figure 4:
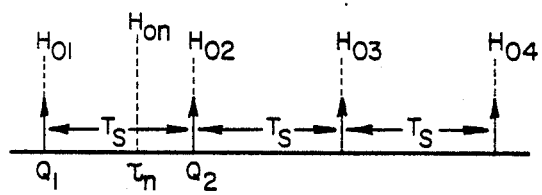
FIG. 4 is a timing diagram useful in illustrating the preferred embodiment.

Sampling in the digital beamformer of FIG. 3 is illustrated in further detail in FIG. 4. In FIG. 4, the hydrophone outputs $H_{o1}, H_{o2}, H_{o3}, H_{o4}$ are sampled at intervals of $T_s$. The exact sampling point, as dictated by the exact, unquantized delay value, is indicated by $\tau_n$. Because of the periodic sampling interval of the digital system, only sample $H_{o1}$, or sample $H_{o2}$ may be selected, rather than the value $H_{on}$ dictated by the exact, unquantized delay value. Rounding of $\tau_n$ to either the $Q_1$ or $Q_2$ value thus affects the ultimate output of the beamformer.

It is the premise of the subject invention that conventional rounding or truncation of the delays does not provide the optimum set of hydrophone outputs for a given steering angle. According to the preferred embodiment, a set of quantized delay values is determined by the processor 39 so as to minimize the derivative of the beam pattern and thereby provide a more optimum selection of the hydrophone outputs.

The derivative of the beam pattern of an arbitrary array of N hydrophones for small quantization errors is approximately proportional to the sum $$S(\phi) = \sum_{n=0}^{N-1} \left[ \left( \sum_{k=0}^{N-1} a_k \right) a_n \tau'(n,\phi) - \left( \sum_{k=0}^{N-1} a_k \tau'(k,\phi) \right) a_n \right] E_n(\phi) \quad (1)$$

where
$E_n(\phi)$ = delay quantization error for the nth hydrophone
$a_n$ = the shading coefficient for the nth hydrophone
$\tau(n,\phi)$ = sum of beamformer and propagation delay for the nth hydrophone with a target at $\phi$
$\tau'(n,\phi)$ = derivative of $\tau(n,\phi)$ with respect to $\phi$ For a given array geometry, $\tau(n,\phi)$ and $\tau'(n,\phi)$ are known. To minimize the derivative of the beam pattern at a desired steering angle $\phi = \phi_s$, the delays are chosen to minimize the weighted sum of the quantization errors, $S(\phi_s)$.

In a digital beamformer, the delay must be represented as an integer multiple of the sample interval, $T_s$. In the preferred embodiment, only two quantized values of the exact delay $\tau(n,\phi)$ are considered. These are the integral multiples immediately larger and immediately smaller than the exact value of the delay $\tau(n,\phi)$. Use of only two values assures that the beam is nominally steered in the desired direction and that the quantization errors are therefore small, allowing use of equation (1) to compute $S(\phi)$.

Mathematically, the two quantized values $Q_1, Q_2$ of the exact delay, $\tau(n,\phi)$, are represented as follows:

$$Q_1[\tau(n,\phi)] = \frac{\tau(n,\phi)}{T_s} \; T_s \quad (2)$$

$$Q_2[\tau(n,\phi)] = \frac{\tau(n,\phi)]}{T_s} \; T_s$$

where $\lceil x \rceil$ and $\lfloor x \rfloor$ are the smallest integer greater than x and the largest integer less than x, respectively There are therefore $2^N$ possible quantization selections for use in the beamformer. The quantization scheme is to compute $S(\phi)$ from equation (1) for each of these $2^N$ combinations and utilize the set of quantized delay values for which $S(\phi)$ is smallest.

As an example, when the array is a uniformly spaced line array with spacing, d, as in FIG. 3, the delay, $\tau(n,\phi)$, is given by $\tau(n,\phi)$, is given by $$\tau(n,\phi) = \frac{dn}{c} (\sin\phi - \sin\phi_s) \quad (3)$$

where $\phi_s$ is the desired steering angle and c is the speed of sound. Then, at frequency $\omega$, equation (1) reduces to $$S(\phi) = \quad (4)$$

$$\frac{-2\omega d}{c} \cos \phi_s \sum_{n=0}^{N-1} \left[ \left( \sum_{n=0}^{N-1} a_k \right)\left( n - \frac{N-1}{2} \right) a_n \right] E_n(\phi)$$

The weighting function, $$W_n = \left( \sum_{k=0}^{N-1} a_k \right)(n - N - 1) a_n \quad (5)$$

is pre-computed and stored for use in the evaluation of $S(\phi)$ over the $2^N$ quantization values.

The computation of the $2^N$ sums required for selection of the quantized delay set can be performed efficiently by using the fact that the quantization errors associated with the two quantized values of the exact delay $Q1(\tau_n)$ and $Q2(\tau_n)$, say $E_{1n}$ and $E_{2n}$, are related by $$E_{2n} = E_{1n} + T_s \quad (6)$$

Figure 5:
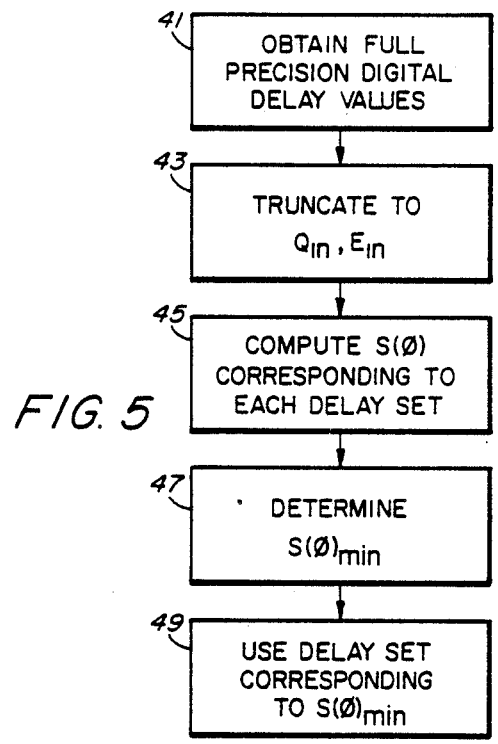
FIG. 5 is a flow diagram of the method of the preferred embodiment.

FIG. 5 is a flow diagram illustrating the overall method of determining the optimum delay set. In steps 41 and 43 the actual delay values are computed to full arithmetic precision and then truncated to obtain $Q_{1n}[\tau_n]$ and $E_{1n}$.

In step 45, $S(\phi)$ is computed for each delay set. First, the N products, $W_n E_{1n}$, are computed using the stored values of $W_n$. Then these N products are accumulated to yield the value of $S(\phi)$ for the case when all delays are truncated, $Q_{1n}(\tau_n)$. All other values of $S(\phi)$ can be computed from this initial value by appropriate addition of $W_n T_s$, using equation (6). Consequently, if the $W_n T_s$ are precomputed and stored, evaluation of the $2^N$ sums requires only N multiplies and $(N+2^N-1)$ additions. Once the smallest sum is determined, the associated set of delays can be calculated from the truncated set by at most N additions of $T_s$, since $$Q_2[\tau_n] = Q_1[\tau_n] + T_s \quad (8)$$

The computation of the $2^N$ sums is implemented digitally as follows: Let A be an N-bit binary number with LSB, $A_o$, $$A = [A_{N-1} A_{N-2} \ldots A_1 A_0] \quad (8)$$

with A associated with the nth hydrophone. Let $A_n = 0^n$ denote the use of $Q_1(\tau_n)$ to represent $\tau_n$ and $A_n = 1$ denote the use of $Q_2(\tau_n)$. Let d(A) be the decimal value of A and A(d) the binary representation of d. Then the $2^N$ sums, (4), can be represented as $S_k(\phi)$, $k = 0, 1, \ldots 2^N - 1$, where the binary number A(k) indicates whether $E_{1n}$ or $E_{2n}$ is used in computation of the sum, i.e, if $A_n(k) = 0$ use $E_{1n}$, and if $A_n(k) = 1$ used $E_{2n}$. Clearly, the $S_o(\phi)$ is the value of the sum computed using the truncated delays. A sum $S_k(\phi)$ can be computed from another sum, $S_m(\phi)$, with one addition, $$S_k(\phi) = S_m(\phi) + W_n T_s \quad (9)$$

if A(k) differs from A(m) by only an additional "one" in the nth bit, i.e., $$A_n(m) = 0, A_n(k) = 1 \quad (10)$$

and $$A_j(m) = A_j(k), j \neq n$$

For example, $S_3(\phi)$ can be computed from $S_2(\phi)$ since for N=4, A(2)=0010 and A(3)=0011, implying $$S_3(\phi) = S_2(\phi) + W_o T_s$$

By selecting the proper ordering of calculation of the $S_k(\phi)$ for $K = 1, 2, \ldots N-1$, all $S_k(\phi)$ except $S_o(\phi)$ can be computed from previous values with one addition as discussed above.

As each sum, $S_k(\phi)$, is computed it is compared to the smallest previous sum (where $S_o(\phi)$ is used as the starting value). If $S_k(\phi)$ is smaller, then the associated binary word, A(k), is retained as the current pattern, P, so that after $2^N$ sums, P is equal to some A(p) such that $S_p(\phi) > S_k(\phi)$ for all $p = k$. In this manner, $S(\phi)_{min}$ is determined, step 47.

Finally, the delay set corresponding to $S(\phi)_{min}$ is selected for use, step 49. Using (8), the set of quantized delays to be used is then $$Q[\tau_n] = Q[\tau_n] + A(p)T \, n = 0, 1, \ldots N-1 \quad (12)$$

requiring at most N additions (because $A_n(p)$ is either 0 or 1).

Figure 6:
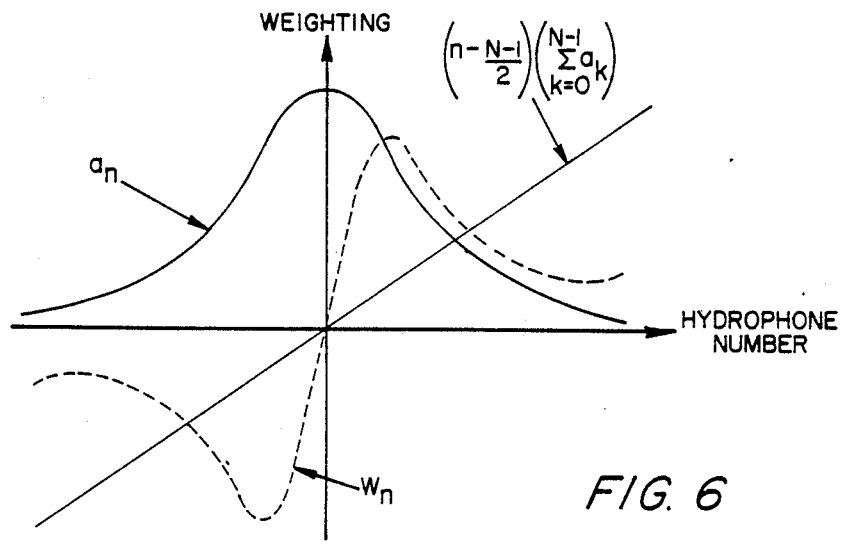
FIG. 6 is a graph of the weighting of quantization errors for a uniform line array.

FIG. 6 shows the weighting function, $W_n$, for typical shading coefficients of a line array. It can be seen that quantization errors near the array center or the ends of the array are not as important as those near the half array centers in determining beam mis-steering. Errors near the array ends have little effect because they are attenuated by the shading coefficients. Those in the center have little influence on steering because their effect is easily offset by those farther from the center. This example illustrates why conventional quantization methods, such as rounding, may not be the best approach. For example, if delays at the array center were perfectly quantized, then pairs of hydrophones symmetrically spaced about the array center would have equal but opposite (in sign) quantization errors. These errors, therefore, add in their effect on missteering because $W_n$ is also an odd function about the array center.

If the steering errors are small in comparison to the main lobe width, then the steering error can be approximated as $$\Delta \phi = \left( \frac{dB}{d\phi} \bigg|_{\phi = \phi_s} \right) \left( \frac{d^2 B}{d\phi^2} \bigg|_{\phi = \phi_s} \right)^{-1}$$

where $dB/d\phi$ and $d^2B/d\phi^2$ are the first and second derivatives of the beam pattern, B, with respect to the signal arrival angle and where $\phi_s$ is the desired steering angle. Since $dB/d\phi$ (evaluated at $\phi = \phi_s$) is proportional to $S(\phi)$, the reduction in steering errors resulting from the use of this quantization method is approximately proportional to the reduction in $S(\phi)$.

Figure 7:
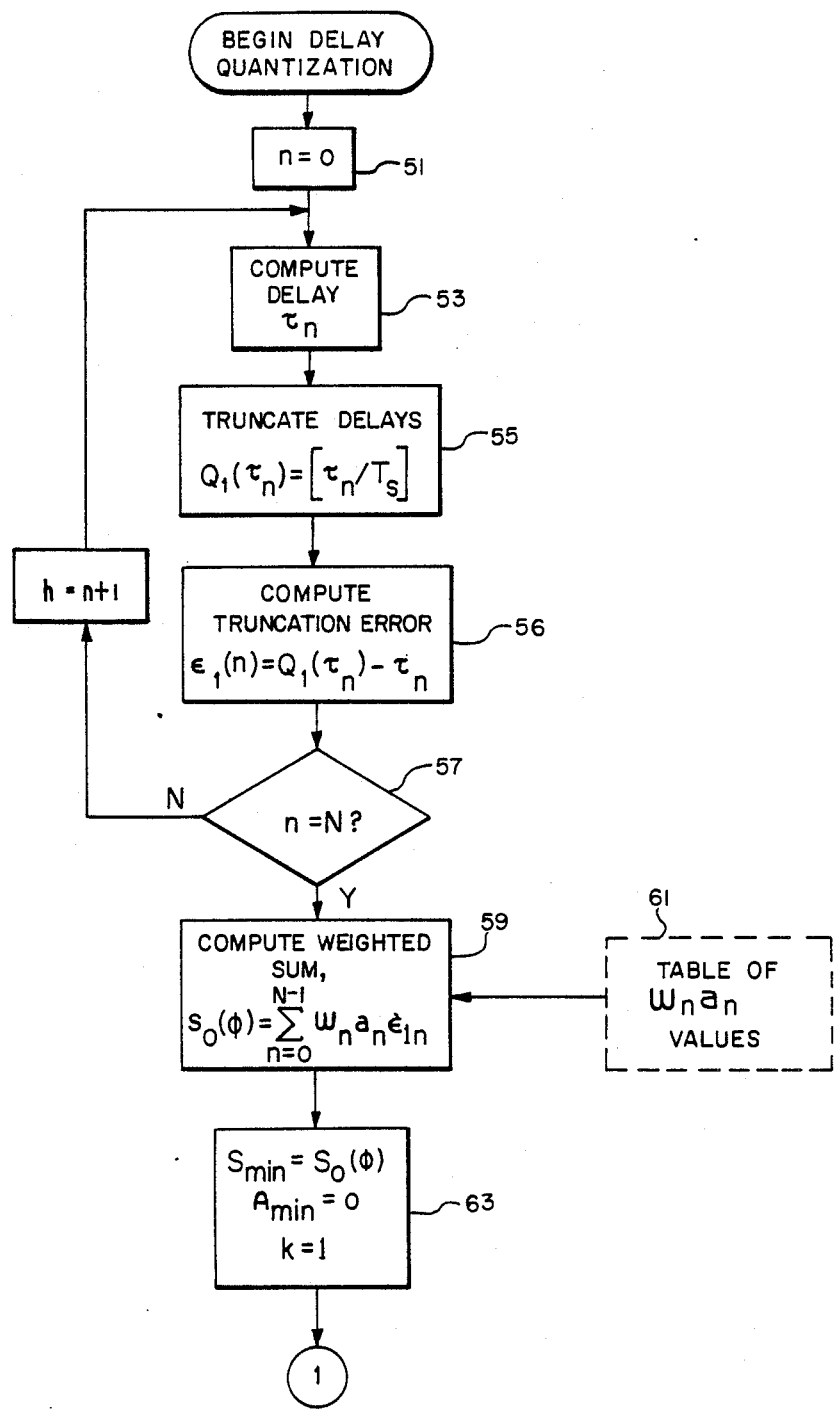
FIGS. 7, 8, and 9 are flow charts presenting more detail of the method of the preferred embodiment.
Figure 8:
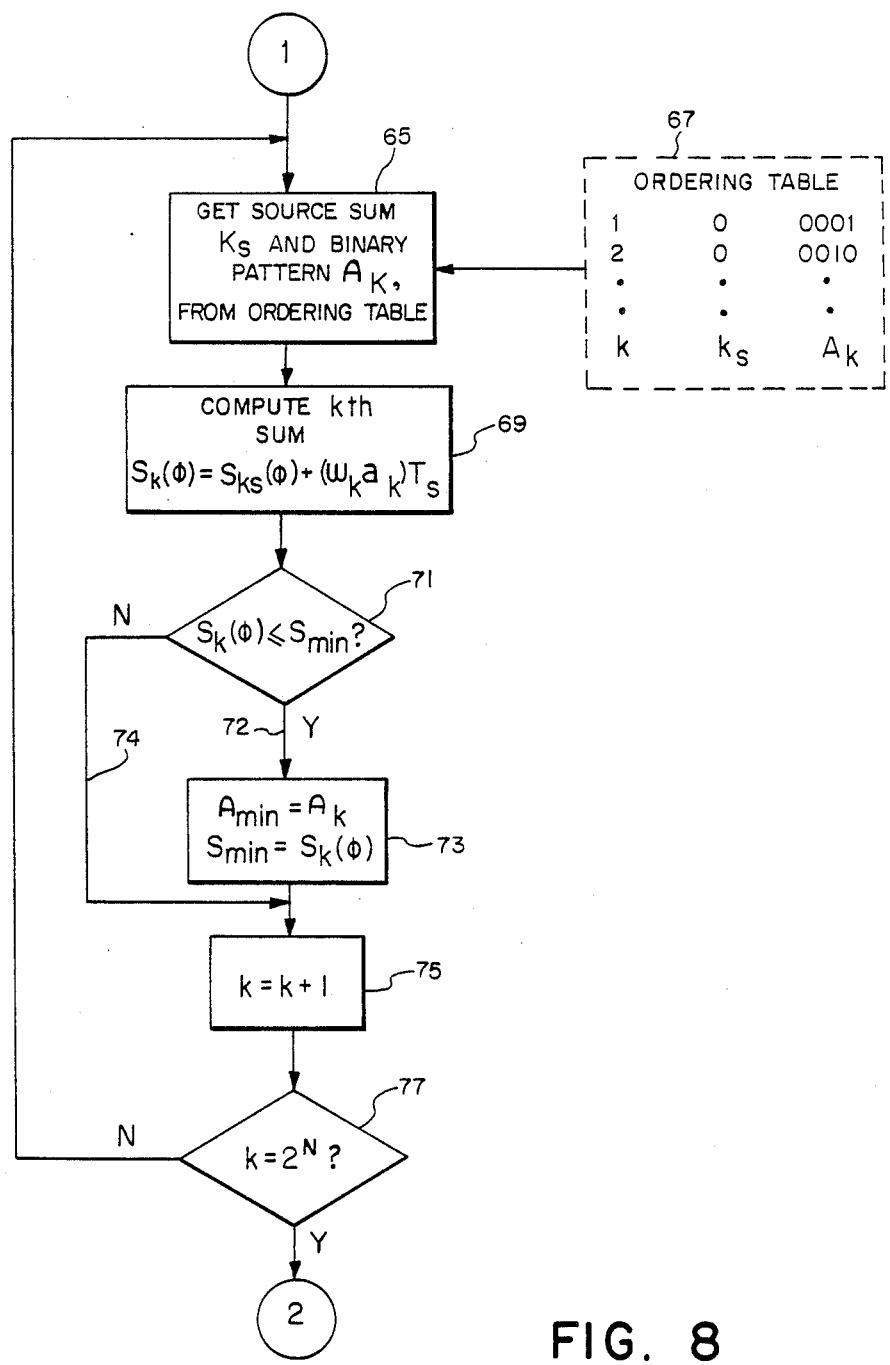
Figure 9:
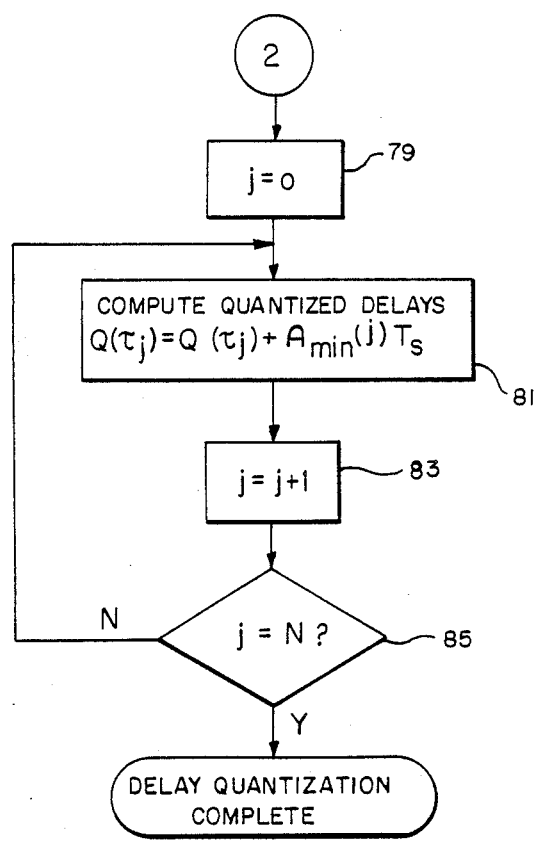

The flow chart of FIGS. 7-9 illustrates a manner of implementation of the delay quantization scheme applicable to either software implementation on a general purpose computer or in a special purpose processor. The number of sensors is assumed to be N, so the number of sums, $S_k(\phi)$, to be calculated is $2^N$. The first loop in the delay quantization (FIG. 7) computes the exact (to the full precision of the host computer) delay values (step 53), and then truncates them to the number of bits used in the beamformer (step 55). The delay calculation is exactly as performed in most sonar systems, and is not unique to this invention. If $$v_n = (x_n, y_n, z_n)^T$$
$$= \text{position vector for nth sensor (measured from an arbitrary reference point)}$$

$u(\phi)$ = unit vector in the direction the beam is to be steered then the nth sensor delay is given by $$\tau_n = \frac{1}{c} v_n \cdot u_n(\phi)$$

where v u is the vector inner product and c is the speed of propagation of the plane wave signal. The truncation error $e_1(n)$, calculated in step 56, is the difference between the truncated delay value $Q_1(\tau_n)$ and the actual (full precision) value. Until N values are computed, the test 57 (n=N?) results in looping back to step 53 to compute another delay value $\tau_n$.

Once N delay values are calculated, the delay quantizer then computes the initial sum, $S_o(\phi)$, as shown in step 59, using a table 61 of parameters, $W_n a_n$, which are precomputed and stored. The shading coefficients, $a_n$, are used to produce acceptably low sidelobes in the beam response, and the method of calculation is well-known. The array weighting factors are computed based upon the array geometry as described above. The values for the minimum sum, $S_{min}$, and the associated binary pattern, $A_{min}$, are set to $S_o(\phi)$ and to zero, respectively (step 63).

The second loop in the procedure (FIG. 8) computes the remaining sums in the efficient manner described above (steps 65, 69) and compares the sum values to the previous minimum (step 71). When the current sum is smaller, decision path 72 is followed, the smaller sum is retained as the minimum sum (step 73), and the associated binary pattern is saved for later use in calculating the quantized delays. When the current sum is not smaller than the previous minimum, decision path 74 is followed. Step 73 and path 74 each lead to block 75 where the index k is incremented. A decision is made at 77 whether all source sums have been calculated, in which case, the flow proceeds to FIG. 9.

The sequence of calculation described above is stored in an Ordering Table 67 which gives, for each sum index, k, the index, $k_s$, of the sum that is to be used to calculate sum k and the binary pattern associated with sum k, $A_k$. Note that this binary pattern is just the binary representation of k, so that if the delay quantization is implemented in binary arithmetic, the binary value of k is available and will be exactly the pattern, $A_k$. The efficiency of the calculation is based upon the fact that the binary pattern associated with the kth sum differs from that of the sum used to compute it in only one binary digit (bit). Table 1 gives an example of such an Ordering Table for an array of 4 sensors (N=4). When the second loop is completed, the retained binary pattern, $A_{min}$, is that associated with the set of delay quantizations producing the minimum sum.

TABLE 1

Example of Ordering Table for N = 4 (four sensors)

| K | $K_s$ | $A_k$ |
|---|---|---|
| 1 | 0 | 0001 |
| 2 | 0 | 0010 |
| 3 | 1 | 0011 |
| 4 | 0 | 0100 |
| 5 | 1 | 0101 |
| 6 | 2 | 0110 |
| 7 | 3 | 0111 |
| 8 | 0 | 1000 |
| 9 | 1 | 1001 |
| 10 | 2 | 1010 |
| 11 | 3 | 1011 |
| 12 | 4 | 1100 |
| 13 | 5 | 1101 |
| 14 | 6 | 1110 |
| 15 | 7 | 1111 |

The final loop (FIG. 9) uses the retained binary pattern, $A_{min}$, to compute the N quantized delays, $Q(\tau_j)$, to be used in beamforming (step 81). This uses the jth bit of the retained binary pattern, $A_{min}$, denoted $A_{min}(j)$. The index "j" is initially set to zero (step 79), incremented after each quantized delay calculation (step 83) and tested (step 85) to determine whether all values have been computed or whether step 81 should be repeated for the next value of "j".

A program according to the foregoing FIGS. 7-9 has been implemented on the Digital Equipment VAX 1170. Those skilled in the art will recognize its ready adaptability to special purpose processor circuits as known in the art.

A technique for the quantization of delays in digital beamformers which produces smaller steering errors than existing quantization methods has thus been disclosed. This is done by choosing the quantized delay values to minimize the derivative of the beam pattern at the desired steering angle. Within the main lobe, the location at which this derivative is zero defines the location of the beam pattern maximum, or Maximum Response Axis (MRA). Therefore, by minimizing the derivative, the steering errors are reduced Although the reduction in the derivative could theoretically be due to broadening of the main lobe, it has been shown that if the quantization errors are small, the main lobe shape is insensitive to these errors.

Various applications, modifications and adaptations of the just disclosed preferred embodiment will be apparent from the foregoing disclosure to one skilled in the art. Therefore, it is to be understood that, within the scope of the appended claims, the invention may be practiced other than as specifically disclosed herein.

What is claimed is:

1. In a digital beamformer wherein beamforming is accomplished by summing a number of digital outputs of a plurality of sensors, each corresponding to a quantized delay value, to produce a beam having a derivative and pattern representing beamformer output vs. steering angle, the improvement in the method of beamforming comprising:

selecting the quantized delay values to minimize the derivative of the beam pattern at a selected steering angle.

2. The method of claim 1 wherein the step of selecting includes the steps of:

determining first and second quantization error values corresponding to first and second quantized delay values for each sensor; and determining which combination of said first and second quantization error values minimizes said derivative.

3. The method of claim 2 wherein the step of determining the first and second error quantization values comprises the steps of:

organizing a combination of $2^N$ sets of binary numbers, each set having a "N" bits, N being the number of hydrophones, wherein a "zero" corresponds to the first quantization error value and wherein a "one" corresponds to the second quantization error value; and ordering the sets such that each set differs from the preceding one only by an additional "one" in the N-th bit position.

4. The method of claim 3 wherein said sensors each provide an analog output and wherein said digital outputs are produced by sampling said analog outputs utilizing a sample interval of $T_s$ and wherein the step of determining which combination minimizes said derivative comprises the steps of:

successively calculating the derivative of the beamformer pattern $S_k(\phi)$ for each successive set by addition of $W_n T_s$, where $W_n$ is the shading factor for the N-th hydrophone; and retaining the set corresponding to the smaller value of the derivative after each successive calculation.

5. The method of claim 4 further including the steps of:

determining the set of quantized delays $Q[\tau_n]$ according to the formula $Q[\tau_n] = Q_1[\tau_n] + A_n(p)T_s$ where $Q_1[\tau_n]$ is the set of binary numbers retained at the end of said step of successively calculating the derivative.

6. A method of digital beamforming employing an array of hydrophones each hydrophone providing an output, the method comprising the steps of:

sampling the hydrophone outputs at a frequency of $1/T_s$, where $T_s$ is a constant sample interval, to produce a plurality of sampled outputs;

determining first and second quantization error values corresponding to first and second quantized delays for each hydrophone, respectively;

determining a set of error values which minimizes the derivative of the beam pattern of said array of hydrophones, one member of the set corresponding to each of said hydrophones and comprising either a said first quantization error value or a said second quantization error value; and utilizing said set to select the sampled outputs to be used in beamforming.

7. The method of claim 6 wherein the step of determining first and second quantization error values comprises the steps of:

determining the first quantized error value by quantizing an unquantized delay value for each hydrophone; and determining the second quantization error value by adding $T_s$ times a selected factor to each first quantized delay value.

8. The method of claim 6 wherein the step of utilizing said set to select the sampled outputs comprises the steps of:

determining the set of quantization delays corresponding to said set of error values; and selecting the hydrophone output sampled at the sample time corresponding to each quantized delay value in said set of quantization delays.

9. The method of claim 8 wherein said selected factor is the constant "one" for each second quantized delay value determined.

10. The method of claim 8 wherein said selected factor comprises a shading factor determined for each hydrophone.

11. The method of claim 8 wherein said unquantized delay value is determined by computing the full precision actual delay value.

12. The method of claim 6 wherein the step of determining said set of error values comprises the steps of:

organizing a combination of $2^N$ sets of binary numbers, each set having "N" bits, N being the number of hydrophones, wherein a "zero" corresponds to the first quantization error value and wherein a "one" corresponds to the second quantization error value;

ordering the sets such that each set differs from the preceding one only by an additional "one" in the N-th bit position;

successively calculating the derivative of the beamformer pattern $S_k(\phi)$ for each successive set by addition of $W_n T_s$, where $W_n$ is the shading factor for the N-th hydrophone; and retaining the set corresponding to the smaller value of the derivative after each successive calculation.

13. The method of claim 12 wherein the step of utilizing includes the step of determining the set of quantized delays $Q[\tau_n]$ according to the formula $Q[\tau_n] = Q_1[\tau_n] + A_n(p)T_s$ where $Q_1[\tau_n]$ is the set of quantized delay values corresponding to the first error values for each hydrophone and $A_n(p)$ is the set of binary numbers retained at the end of said step of successively calculating the derivative.

* * * * *